United States Patent Office 2,949,744
Patented Aug. 23, 1960

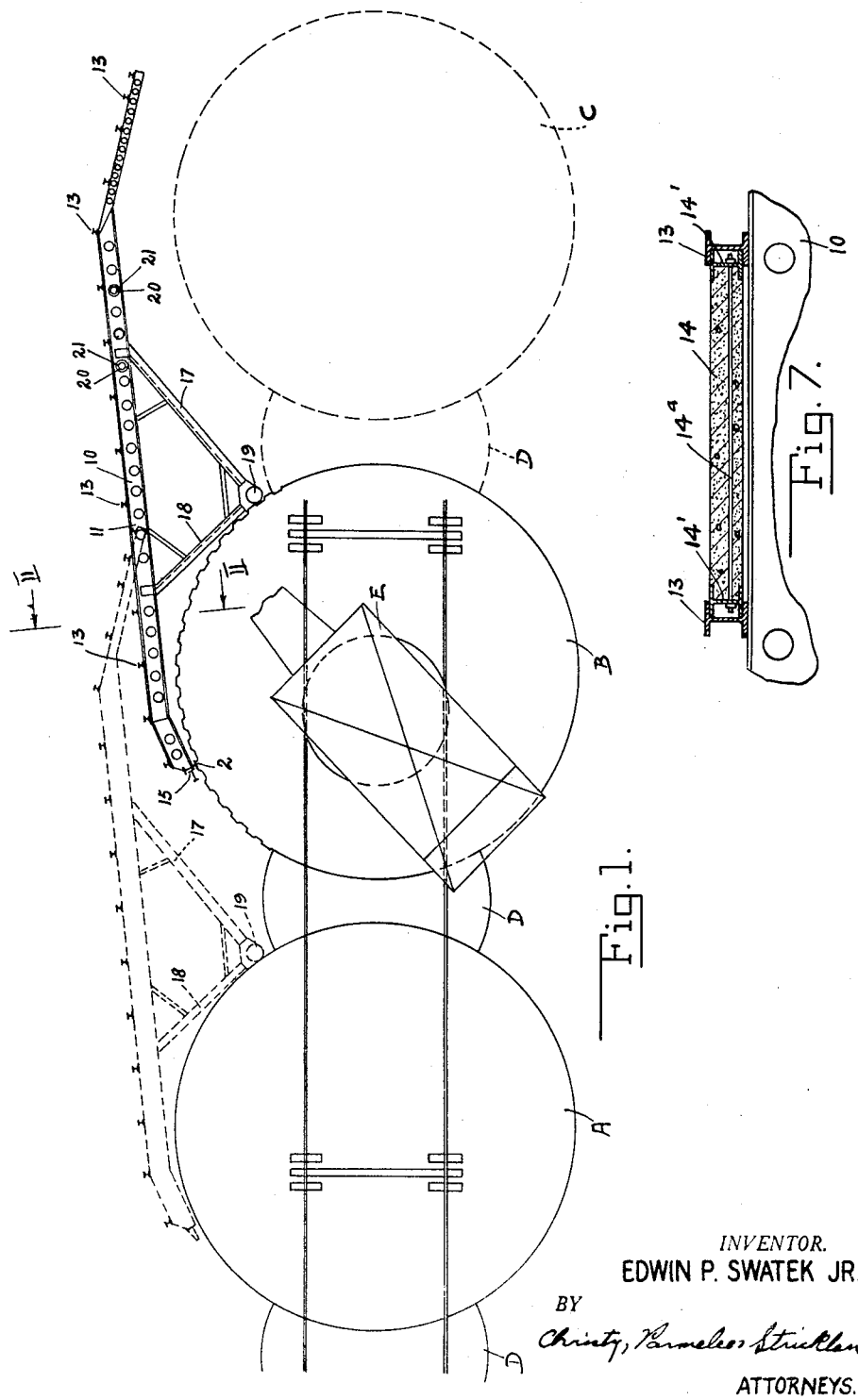

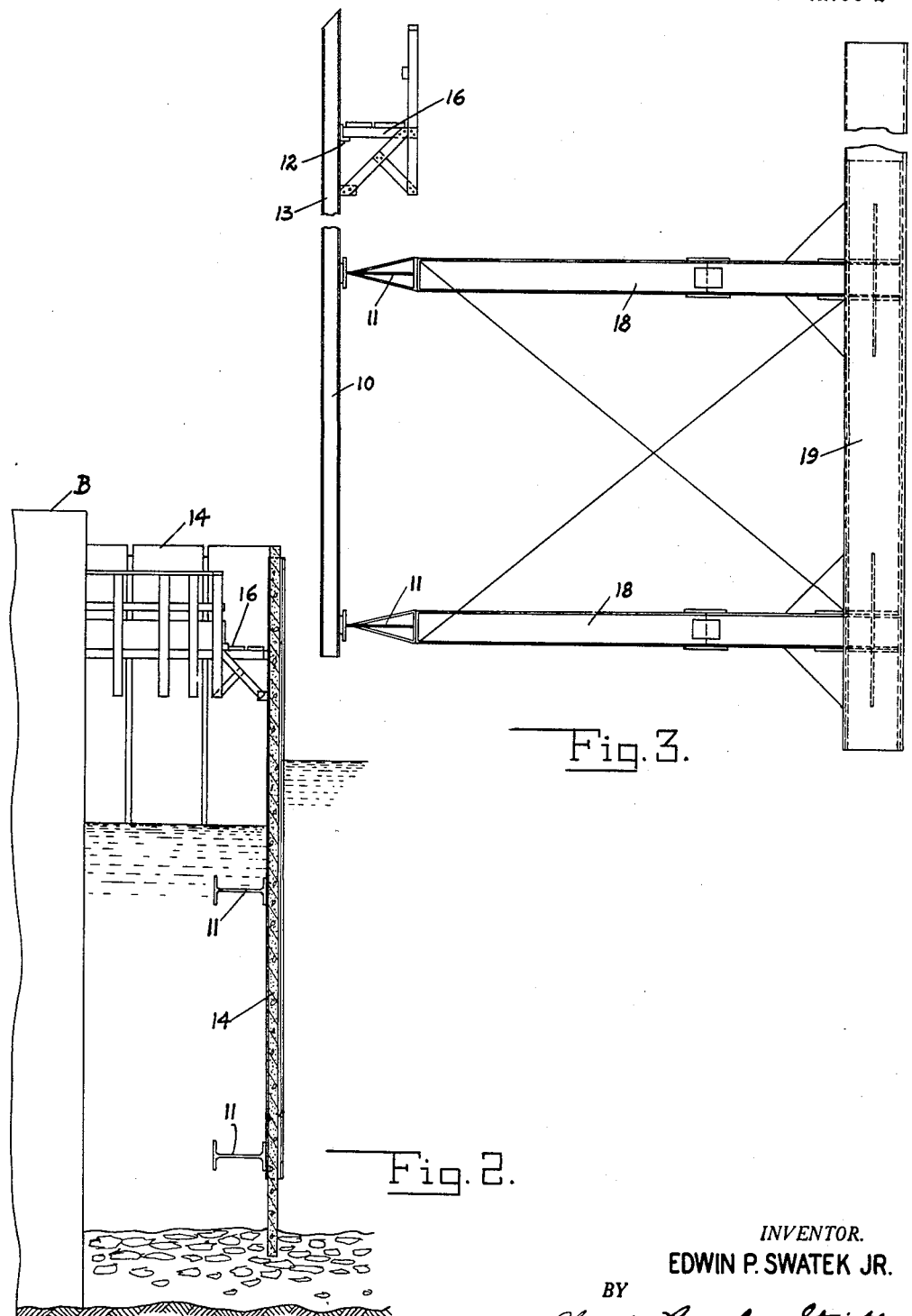

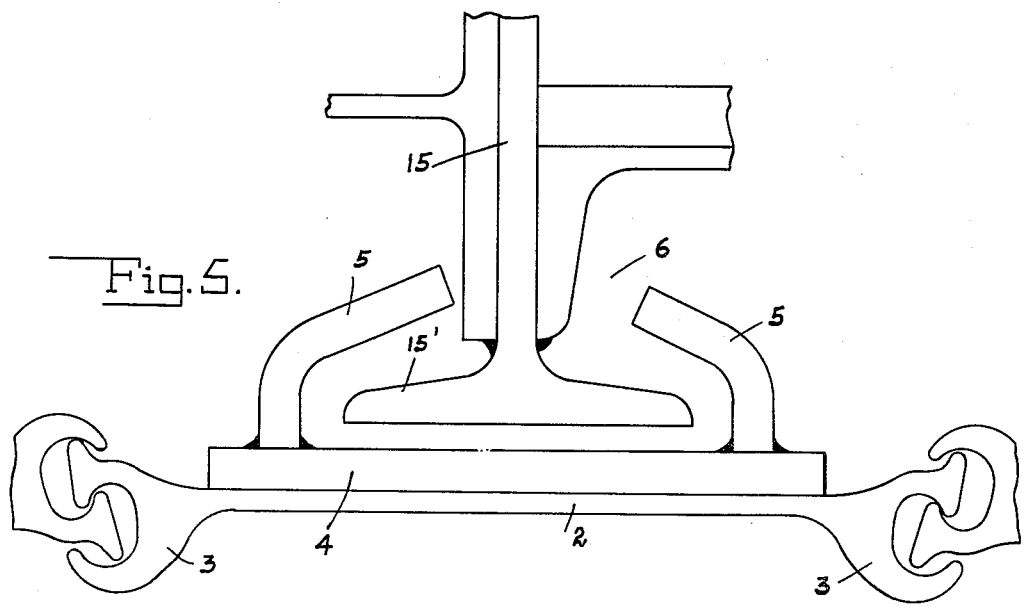
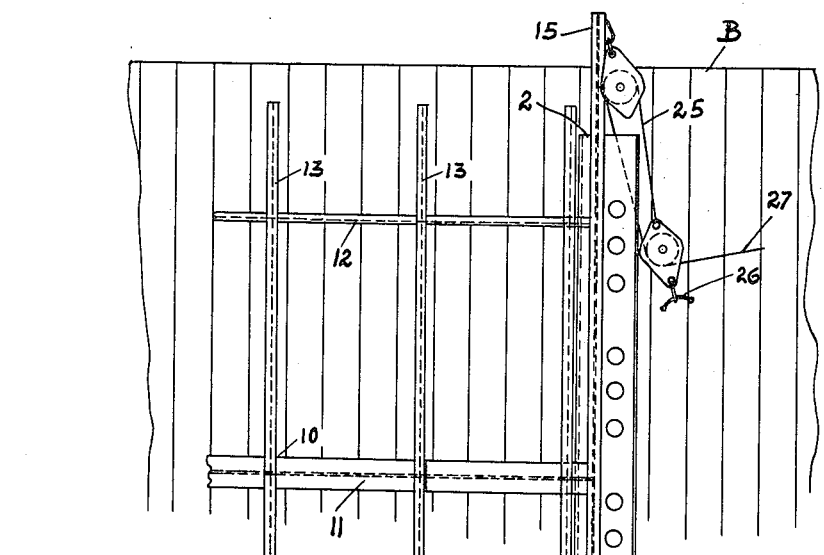

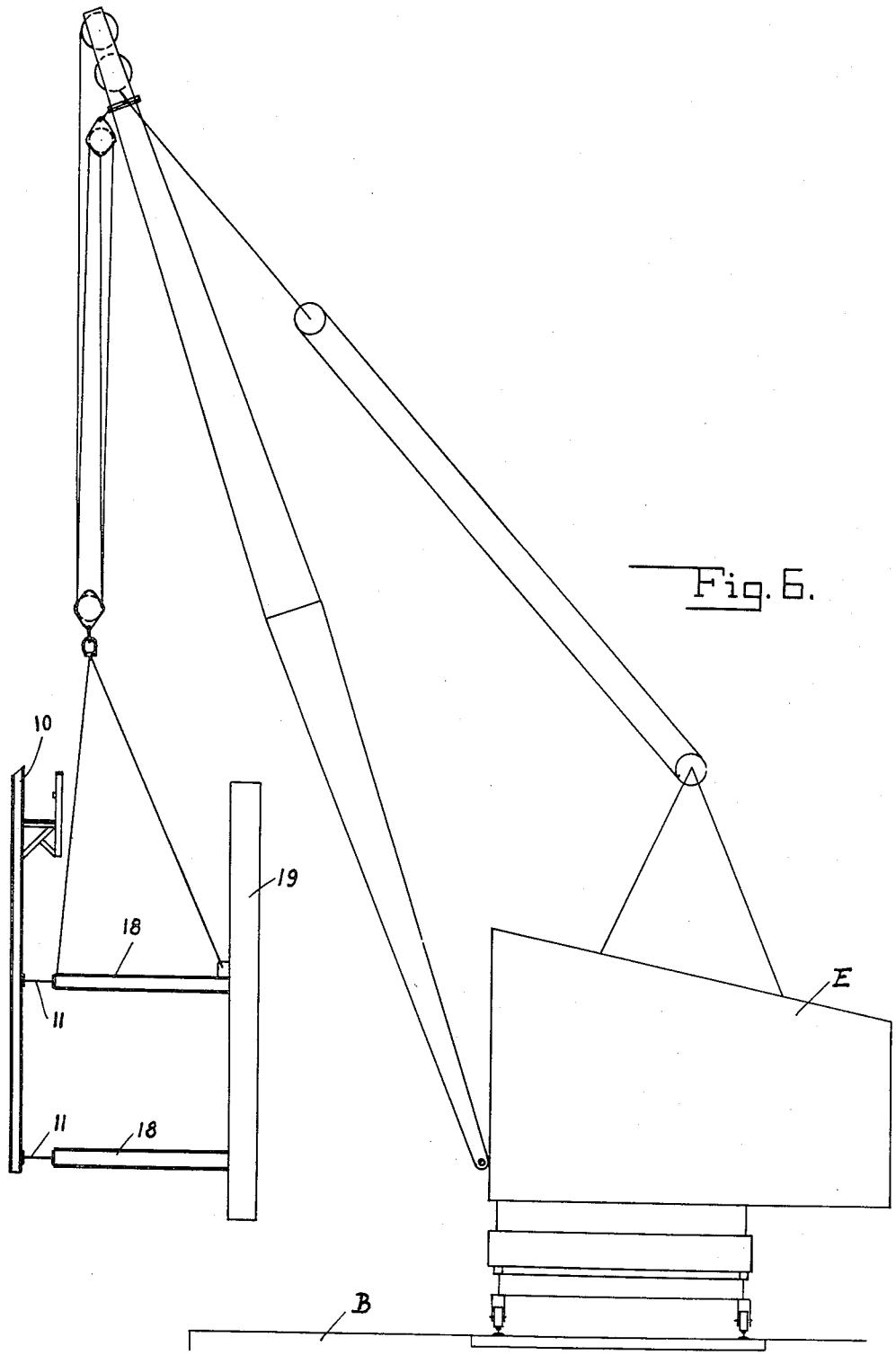

2,949,744

WATER CURRENT DEFLECTOR AND METHOD OF USING SAME

Edwin Paul Swatek, Jr., Sewickley, Pa., assignor to Dravo Corporation, Pittsburgh, Pa., a corporation of Pennsylvania Filed Feb. 17, 1956, Ser. No. 566,158

5 Claims. (Cl. 61—34)

This invention relates to the construction of cofferdams in swift water, and is for a deflector for use in such construction and a novel method of cofferdam construction.

In the building of dams across a body of flowing water, it is often necessary or desirable to construct a succession of cells starting at the shore line and extending outwardly. Each cell is circular and it is formed of sheet metal piles having interlocking edges, as is well understood in the art. After the cell has been formed by thus driving a circular series of piles, the interior of the cell is filled with concrete, earth, or rock, the tops of the cells being above the water line. The cells are spaced at relatively short intervals and a connecting dam of sheet piling is usually driven from one cell to the next, and it also is filled with earth, rock, concrete or the like.

The placing of any obstacle across the flow of a stream, particularly one having considerable current, increases the velocity of the flow toward open and unobstructed areas, so that the resulting swift current makes the setting of these cells difficult and dangerous.

The present invention has for its object to provide a method of and apparatus for deflecting the swift curent of water away from the zone of operation and providing a zone back of the deflector in which operations may be carried out with far less trouble and effort and danger. A further object of my invention is to provide a deflector which is anchored to a completed cell and cantilevered against said cell. Further objects are to provide a deflector which may be moved from one cell to the next as the construction progresses, and which is provided with removable panels or bulkheads to facilitate its manipulation.

These and other objects and advantages are secured by my invention which may be fully understood by reference to the accompanying drawings, in which:

Fig. 1 is a top plan view showing the deflector in position on one cofferdam with its previous position indicated in dotted lines, and with the cofferdam next to be installed indicated in dash lines;

Fig. 2 is a vertical section in the plane of line II—II of Fig. 1 looking in the direction of the arrows;

Fig. 3 is a section on the same line looking in the opposite direction with the view-obstructing portion of the cofferdam omitted;

Fig. 4 is a fragmentary front view of the supporting cofferdam and a part of the deflector frame;

Fig. 5 is an enlarged detail view showing in plan the separable connection between the cofferdam and the deflector;

Fig. 6 is a schematic view showing the manner in which the deflector is handled by the whirling crane; and Fig. 7 is a top plan view of a fragment of the deflector showing a single bulkhead and guide therefor.

Referring to the drawings, and first particularly to Fig. 1, A designates one of a series of cells that has been completed, B designates the next one which has just been completed, and C designates the location of the one next to be built. D designates a connecting dam between A and B. A trackway extends along the top of the completed cells. The first cell is started at or near the shore and succesive ones are positioned further out in the stream. A crane of the type referred to as a "whirler" is indicated at E, and it is movable along the tracks.

Each cell is formed by driving a circular series of interlocking metal piles into the river bed with the tops of the piles extending above the water line. These piles are of a type commonly used, and they have interfitting tongues and grooves in their side edges, as shown in Fig. 5. After the piles have been driven, the interior of the cell may be filled with earth and/or rock, or concrete.

According to the present invention one pile, hereinafter called a special or "anchor" pile, located on the upstream side of the cell, is provided. This particular pile, designated 2, has the usual interlocking edge construction 3 shown in Fig. 5. It has a plate 4 secured to its outer face to which are welded two spaced inwardly converging flanges or guide strips 5, with a vertically extending opening or slot 6 between their confronting edges. This pile, which is a part of each cell, is set in the upstream side of the cell inshore from the center line that extends up and downstream.

With my invention there is provided a metal frame, designated generally as 10, and which has at least two horizontally extending beams or guides 11 with a lighter horizontally extending section 12 near the top. There are a series of parallel vertical I-beams 13 on the upstream sides of these members 11 and 12, serving as vertical framing and also providing vertical slideways or retainers for concrete bulkheads or panels 14 which are subsequently placed in them.

The inner edge of the frame is formed with a vertical I-beam section 15, with the base flange 15' of the section (see Fig. 5) projecting rearwardly beyond the guides 11. As thus constructed the base flange of the I-beam can be slid vertically into and out of the guideway formed by the plate 4 and guides 5 on the special pile 2, but the guide will provide an anchor that will interlock the end of the deflector when so engaged to the special pile of the cell which has last been completed.

A walk way 16 is provided along the top of the deflector frame on the downstream side at a level above the water line.

Secured to the downstream side of each of the main horizontal girders are similar frames comprising a strut 17 that extends from a point to the right of the center of the deflector as viewed in Fig. 1 angularly toward the cell B, and a shorter strut 18 extends from a point to the left of the center at an angle converging toward the end of the strut 17. A vertical member in the form of a pipe 19 is connected through gussets with the converging struts of the two similar frames.

When the deflector is in position, the pipe 19 bears against an upstream surface of the cell B, and the thrust of the water is transmitted through the struts to the cell. The whole deflector frame is thereby cantilevered against the cell with the inner end of the frame anchored to the cell. The frame is of such horizontal extent as to project toward the right, as viewed in Fig. 1, far enough to deflect the current of the flowing stream out of the site where the cell C is to be constructed.

The frame is provided with one or more, preferably two, vertical pipes 20 located intermediate its ends, but preferably outwardly from its center. These constitute spud-wells, into which spuds 21 in the form of pipes of smaller diameter can be set when the frame is in position. For example, in a typical installation where the cofferdam cells are nearly 48 feet in diameter and the overall length of the frame is of the order of about 80 feet, the spud-wells are formed of 8-inch diameter pipe, and the spuds are 6-inch diameter pipe. The spuds may be driven by a pile driver to a point of refusal in the river bed, or to a depth to provide adequate anchorage for the frame, and to make the assembly more secure, cables (not shown) may be attached to the tops of the spuds and the frame. The I-beam 15 at the inner end of the frame may also be secured to the special pile 2 by cables and thereby remove some of the strains to which the guides 5 might otherwise be subjected.

The deflector frame is provided for the support of and positioning of the bulkheads or panels 14 which are guided between the vertical I-beams 13 at regular intervals along the upstream face of the frame. These bulkheads could be formed of metal plates, or planks, but as shown in Fig. 7 are preferably monolithic reinforced concrete slabs with a metal I-beam section 14' along each vertical edge. These panels are of such length and the I-beams 14' are small enough to be slidably received in the I-beams 13. Tie rods are indicated at 14a. By spacing the I-beams 13 equal distances apart, the panels may be interchangeable. As shown, the panels are of a length such that when they are in position their bottom edges rest on, and may even sink into the river bed, while their tops are above the upstream water level. Due to the current the water level will usually be higher upstream of the deflector than below.

In the practice of my invention, after each cell is built with the special pile 2 at the proper location and the deflector is no longer required for that cell, the whirler crane removes the bulkheads or panels 14 from the frame. Its lines are then attached to the frame, and the frame is lifted vertically until the I-beam 15 with its flanges 15' clears the special pile, the frame at the same time clearing the spuds 21, if they have not previously been pulled. The frame is then transported to the just completed cell by the crane, and the I-beam 15 brought to position to engage the guideway in the special pile of this new cell. The frame is then lowered, the guide in the special pile having been first liberally greased. During lowering the frame is kept horizontal and the pipe 19 on the bracing frame will be guided down the face of the piling. Since none of the bulkheads will be in position at the time of transfer, the water current will have a minimum effect in the placing of the frame. The walk way is kept level with the water surface to indicate the proper lowering of the frame. The two spuds 21 will be inserted after the frame is in final position. After the frame has been set, the crane or whirler places the bulkheads in place, starting from the end of the deflector which is anchored to the special pile and progressing toward the free end.

If the I-beam 15 with its flange binds in the special guide pile during lowering of the frame, a block-and-tackle rig 25 may have one block attached to the top of the I-beam 15 as shown in Fig. 4, and its other block hooked to a clevis 26 welded to the piles of the cell, and the cable 27 may be carried to shore and hitched to a tractor so as to exert a downward pull to overcome the resistance of the frame to lowering.

The invention thus provides a relatively simple procedure of progressively extending the cells of a cofferdam across a stream where current is an obstacle by anchoring a cantilevered deflector against a completed cell to protect the site of the next cell from the force of the current and enable each new cell to be built in turn without the usual difficulty created by the current and with less hazard to personnel engaged in the work.

Various changes and modifications may of course be made in the design of the structure within the contemplation of my invention and under the scope of the following claims.

I claim:

1. The combination with one circular cell of a cofferdam being constructed across a flowing stream in which the cell is comprised of a circular series of piles forming an enclosure and wherein one pile on an upstream quarter of the cell has anchoring cleats thereon, of a deflector for diverting the current from the site of the next cell to be built comprising a frame extending in a cross-stream direction constructed of horizontal and vertical structural members, said frame having a structural section at one end thereof releasably interlocked with said anchoring cleats, bracing elements on the downstream side of the frame intermediate the ends of the frame bearing against the other upstream quarter of said circular wall for cantilevering the frame against the cell, said frame being longer than the diameter of the cell to which it is attached whereby its free end extends in a cross-stream direction from its point of anchorage to a point beyond the site of the next cell to be built, and removable bulkheads on the frame forming a substantially continuous deflecting surface over the area of the frame.

2. The combination defined in claim 1 in which the said structural end section on the frame is vertically slidable into and out of engagement with the anchoring cleats on said pile.

3. A deflector for use in the construction of a series of cofferdams across a stream comprising a frame having a plurality of horizontally-extending beam members, a series of flanged vertical structural bulkhead-retaining sections secured to one face of the horizontal beam members and forming between them flanged vertical guideways to receive removable bulkheads between each two vertical sections, bulkheads slidably fitted into said guideways, a vertical structural anchoring section at one end of the frame for releasably attaching said end of the frame to a fixed structure, and a bracing strut attached to the horizontal beam members at a point between the middle of the frame and that end of the frame remote from the one carrying said vertical structural anchoring section, said bracing strut extending divergently from its point of attachment to the frame toward the end which carries said vertical structural anchoring section, the bracing strut being on the face of the frame opposed to the one to which said vertical bulkhead-retaining sections are secured.

4. A deflector for use in the construction of a series of cofferdams across a stream comprising a frame having a plurality of horizontally-extending members, a series of vertical structural members secured to one face of the horizontal members at spaced intervals and forming between them flanged vertical guideways to receive removable bulkheads between each two vertical members, bulkheads slidably fitted into said guideways, an end section at one end of the frame having exposed flanges adapted to be slidably engaged in anchoring cleats for anchoring said end of the frame to a fixed structure, a bracing strut attached to the frame at a point between its center and the end opposite the one to which said end section is attached and extending divergently from the frame toward the end which carries said section, the bracing strut being on the face of the frame opposed to the one to which said vertical structural members are secured, and a second strut extending from the free end of the first strut to the frame and secured thereto between the end which carries said end section and the mid point of the frame.

5. The method of constructing a series of enclosures to form a cofferdam across a flowing stream for diverting the flow thereof, comprising the steps of erecting a self-supporting enclosure at a selected point in the stream, mounting at the face of the enclosure so formed one end of an open-faced frame overlapping the upstream face of said enclosure and extending in a cross-stream direction beyond the side of the next enclosure of the series to be built, securing the frame in fixed relation to said completed enclosure, closing the face of the frame to divert the free flow of water therethrough, erecting the next-succeeding self-supporting enclosure of the series in the site behand said frame, re-opening the face of the frame, removing the frame, and remounting it upon the last completed enclosure, and repeating the procedure for diverting water and erecting enclosures to extend the cofferdam for the desired length.

References Cited in the file of this patent

UNITED STATES PATENTS

| | | |
|---|---|---|
| 408,046 | Roan | July 30, 1889 |
| 1,506,230 | Fargo | Aug. 26, 1924 |
| 2,063,514 | Meem | Dec. 8, 1936 |

OTHER REFERENCES

Compressed Air Magazine, February 1939, pp. 5798–5802.

Construction Methods and Equipment, February 1952, pp. 94–96.

Construction Methods and Equipment, May 1955, pp. 58–62.